United States Patent
Miau (10) Patent No.: US 7,398,165 B1
(45) Date of Patent: Jul. 8, 2008

(54) INTELLIGENT SIGNAL PROCESSOR FOR VORTEX FLOWMETER

(76) Inventor: Jiun-Jih Miau, 7F.-1, No. 88, Sec. 3, Changrong Rd., East District, Tainan City 701 (TW)

( * ) Notice: Subject to any disclaimer, the term of this patent is extended or adjusted under 35 U.S.C. 154(b) by 0 days.

(21) Appl. No.: 11/785,265

(22) Filed: Apr. 17, 2007

(51) Int. Cl.
*G06F 19/00* (2006.01)

(52) U.S. Cl. .......................... 702/45; 702/77; 73/861.24

(58) Field of Classification Search .................. 702/45, 702/49, 50, 77, 100, 182, 183, 189, 190; 73/861.22, 861.24, 861.25
See application file for complete search history.

(56) References Cited

U.S. PATENT DOCUMENTS 5,429,001 A * 7/1995 Kleven .................... 73/861.22
6,386,046 B1 * 5/2002 Mattar ..................... 73/861.22
2006/0217899 A1 * 9/2006 Unsworth et al. ............. 702/45

* cited by examiner

*Primary Examiner*—Bryan Bui
(74) *Attorney, Agent, or Firm*—Rosenberg, Klein & Lee (57) ABSTRACT

The present invention discloses an intelligent signal processor of a vortex flowmeter, the signal processor mainly adopts a digital signal processor structure for processing a flow rate of a fluid. The signal processor uses two different algorithms, one primarily using a fast Fourier transformation (FFT) unit and an auto-correlation unit, and the other primarily using a fast Fourier transformation (FFT) unit and a digital software phase locked loop (SPLL) unit. As the flow rate varies with time, the two algorithms can track a vortex shedding frequency and reduce a vortex shedding frequency error. For maximum and minimum flow rates, a large difference of flow rates will not affect the precision of a measurement. If the flow rate ranges from 50 to 509 m$^3$/hr, the precision is approximately equal to 0.59%~0.35%, which has improved about 2~3 times over the traditional processing method.

7 Claims, 8 Drawing Sheets

INTELLIGENT SIGNAL PROCESSOR FOR VORTEX FLOWMETER

FIELD OF THE INVENTION

The present invention relates to an intelligent signal processor of a vortex flowmeter, and more particularly to a processor of a vortex flowmeter for measuring an accurate vortex shedding frequency by Fourier transformation and auto-correlation or software phase locked loop.

BACKGROUND OF THE INVENTION

Vortex shedding produced by passing a fluid through a cylindrical object is a typical physical problem in the field of fluid dynamics, and vortex shedding has caught much attention and related efforts have been conducted in the past years. Since a change of fluid pressure is created when the vortex is shed, therefore a change of fluid pressure can be used for measuring the vortex shedding frequency which can be used for calculating the fluid flow rate. The vortex shedding has a well-known property that a linear relationship exists between the vortex shedding frequency of a fluid and the flow rate of the fluid within an appropriate range of Reynolds number, and such property is used by the industry as a vortex flowmeter for detecting the vortex shedding frequency.

Figure 1:
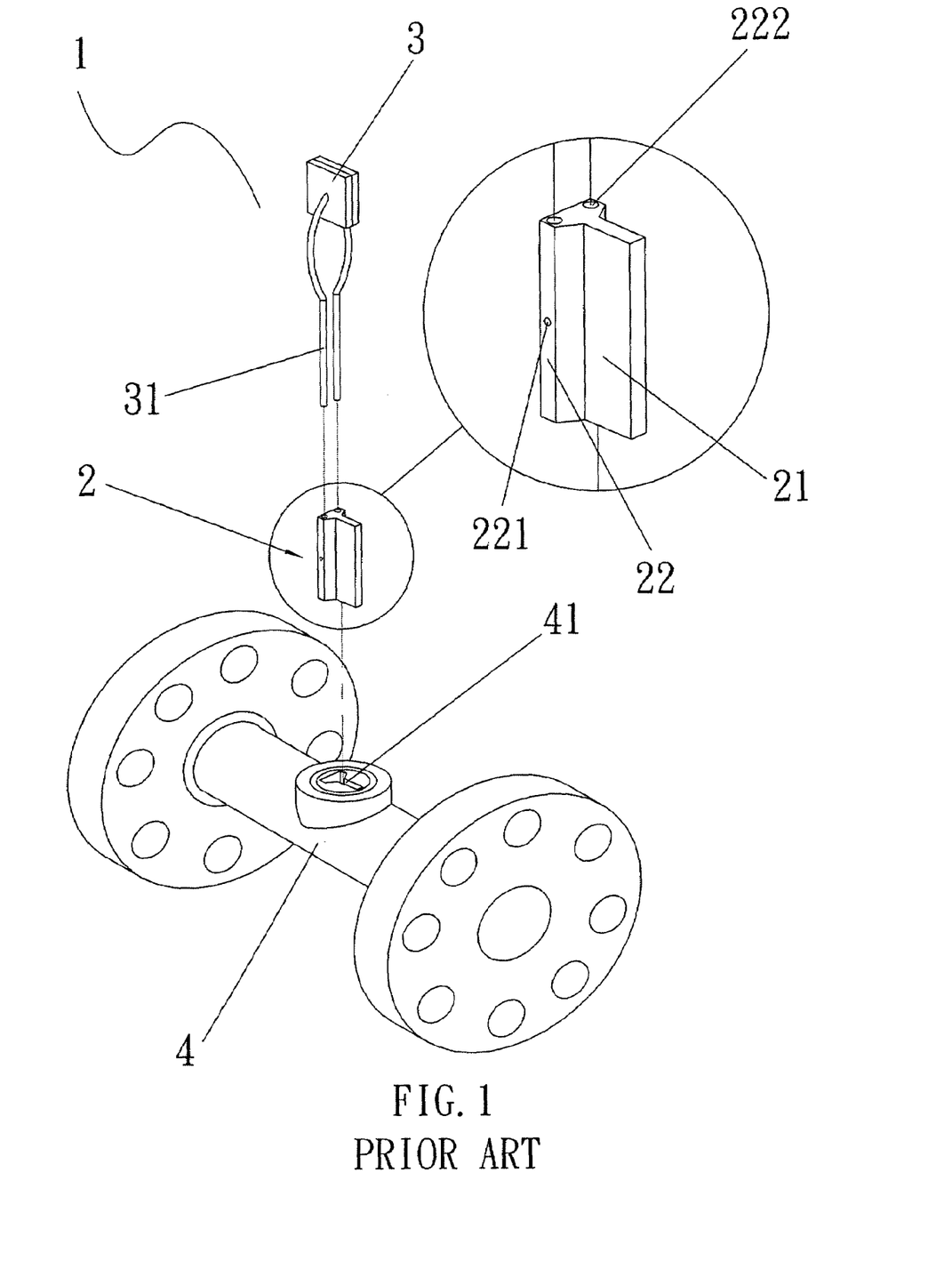
FIG. 1 is an exploded view of a conventional vortex flowmeter.

Referring to FIG. 1 for an exploded view of a conventional vortex flowmeter 1, the vortex flowmeter 1 comprises a vortex shedder 2, a sensor 3 and a circular pipe 4, wherein the vortex shedder 2 is comprised of a flat plate 21 perpendicular to a bluff body 22, and the vortex shedder 2 has a T-shape cross-section for improving the quality of a vortex shedding signal (as disclosed in R.O.C. Pat. No. 071182 and U.S. Pat. No. 5,351,559); the bluff body 22 has a pressure hole 221 disposed separately at appropriate positions on both lateral sides of the bluff body 22, and the pressure hole 221 is connected to a through hole 222; and the sensor 3 has a probe 31 inserted into the through hole 222 of the vortex shedder 2, such that the probe 31 of the sensor 3 can detect the pressure of a fluid turbulence caused by the vortex shedding process through the pressure hole 221, and the sensor 3 can detect the vortex shedding frequency by the pressure change of the fluid. The sensor 3 sends the signal with the measured vortex shedding frequency to an external electronic device, and the electronic device filters and processes the signal transmitted from the sensor 3 to obtain the flow rate of the fluid and the volume flow rate; the circular pipe 4 has a penetrating hole 41 disposed at an appropriate position for fixing the vortex shedder 2, and the circular pipe 4 is connected to a pipeline having a fluid flow, such that the fluid passing through the circular pipe 4 produces shedding vortices by the vortex shedder 2.

The vortex shedding signal detected by the sensor 3 is usually affected by noises when the conventional vortex flowmeter 1 measures the vortex shedding frequency and the signal outputted from the sensor 3 is transmitted to the external electronic device, the noises are filtered by a filter circuit before the signal is used for calculating the vortex shedding frequency. However, the filtering effect of the electronic device is poor if the vortex shedding signal is measured by the sensor 3 at a low noise ratio. As a result, errors will be produced when the electronic device measures the vortex shedding frequency, and the system will become unstable for the automatic flow control.

SUMMARY OF THE INVENTION

In view of the shortcomings of the conventional vortex flowmeter, the inventor of the present invention based on years of experience in the related field to conduct extensive researches and experiments and overcome the foregoing shortcomings and finally invented the present invention having a tracking capability and measuring a vortex shedding frequency as the flow rate of the fluid varies.

The primary objective of the present invention is to provide an intelligent signal processor of a vortex flowmeter, wherein the vortex flowmeter comprises a vortex shedder, an electronic device, a sensor and a circular pipe, and the vortex shedder is comprised of a flat plate perpendicular to a bluff body; the electronic device is fixed to the vortex shedder and comprises an amplifier, a wave filter and a signal processor, and the signal processor adopts a digital signal processor architecture as its main hardware architecture and comprises a wave filter unit and a frequency calculating unit; the sensor is fixed to the flat plate of the vortex shedder; the circular pipe is provided for fixing and limiting the vortex shedder, and the circular pipe is connected to a pipeline having a fluid flow, such that the fluid passing through the circular pipe produces shedding vortices by the vortex shedder.

Another objective of the present invention is to provide an intelligent signal processor of vortex flowmeter, and the signal processor adopts a digital signal processor structure as its main hardware architecture and has the capability of tracking a vortex shedding frequency as the flow rate varies with time and reducing vortex shedding frequency errors. For maximum and minimum flow rates of a fluid, a large difference of flow rates will not affect the precision of a measurement. If the flow rate ranges from 50 to 509 $m^3$/hr, the precision is approximately equal to 0.59%~0.35%, which has improved about 2~3 times over the traditional processing method.

DETAILED DESCRIPTION OF THE PREFERRED EMBODIMENTS

The following detailed description with reference to the accompanying drawings of embodiments are given for example, but such preferred embodiment is not intended to limit the scope of the present invention.

Figure 2:
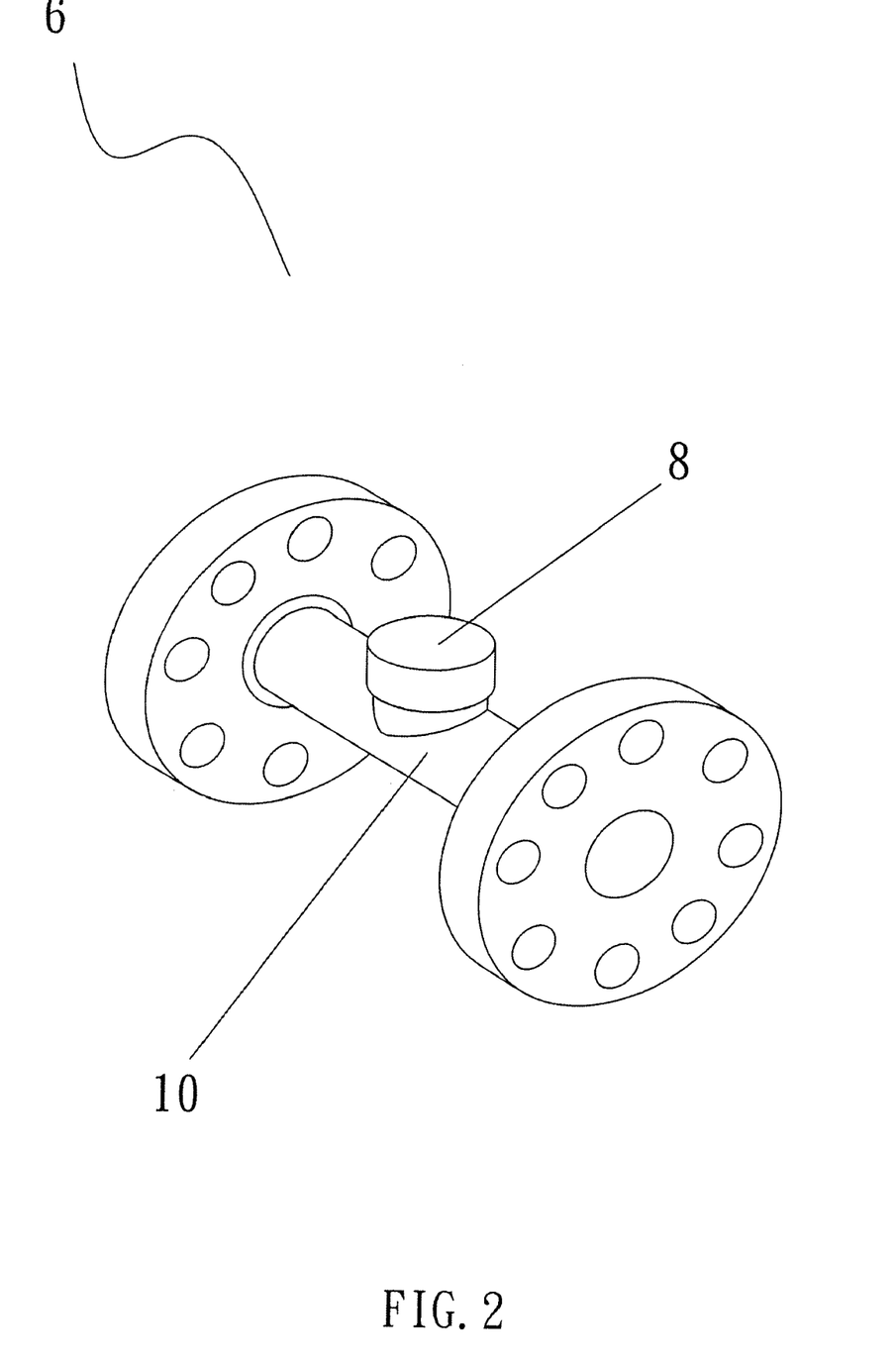
FIG. 2 is a perspective view of a vortex flowmeter of the present invention.
Figure 3:
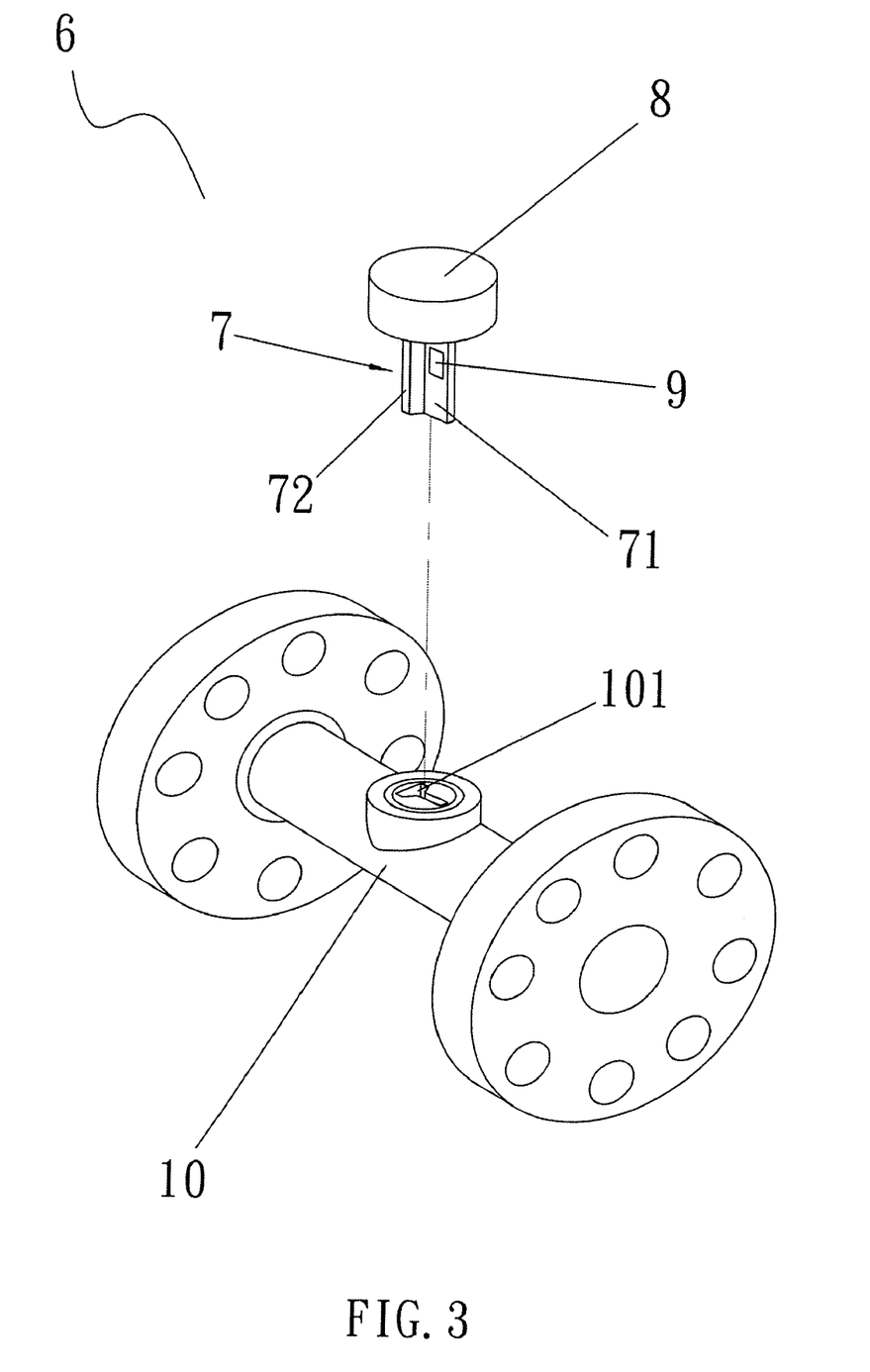
FIG. 3 is an exploded view of a vortex flowmeter of the present invention.
Figure 4:
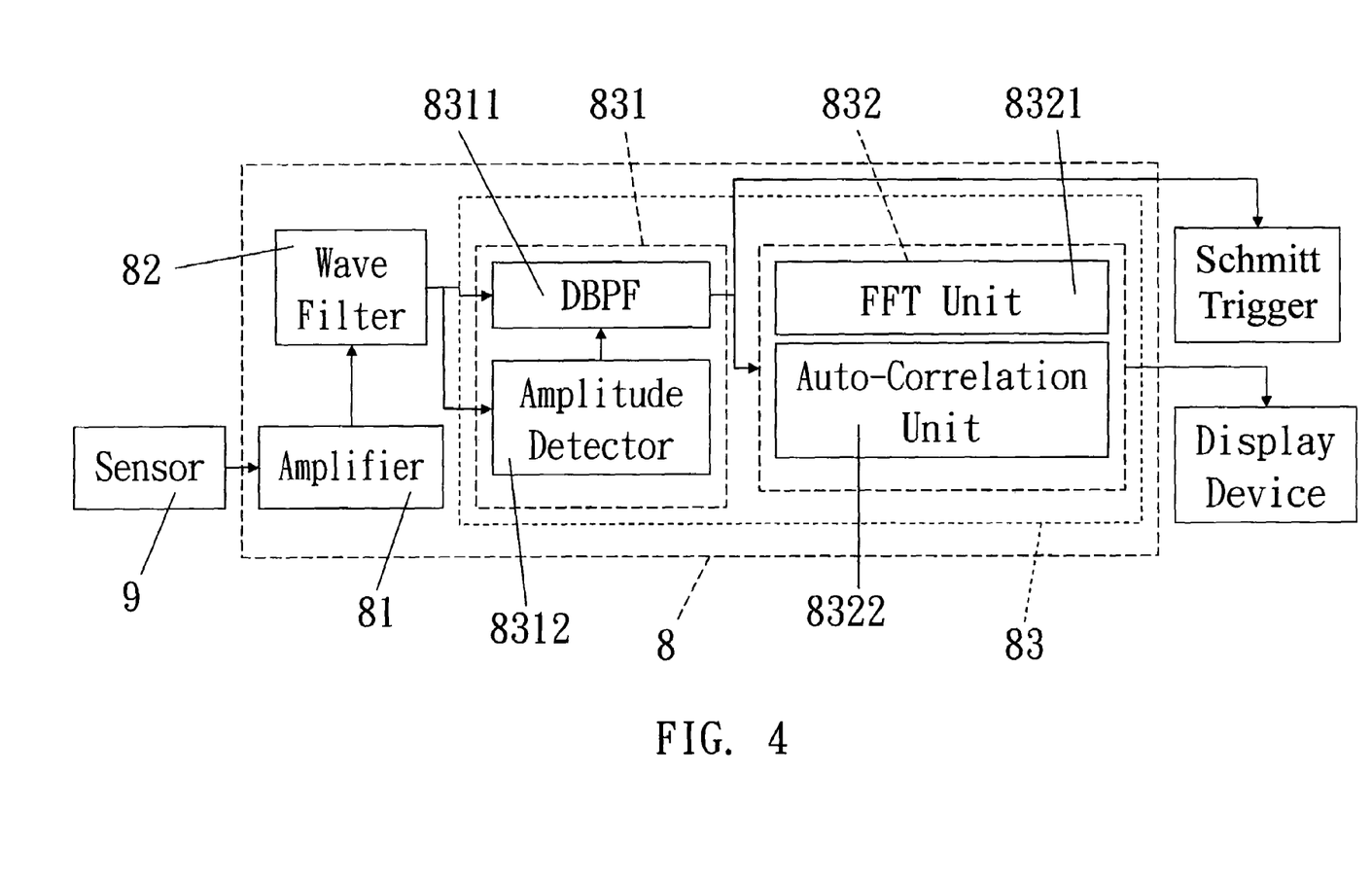
FIG. 4 is a block diagram of an overall structure of an electronic device and a sensor of the present invention.

Referring to FIGS. 2 to 4 for a perspective view, an exploded view and an overall structural block diagram of a vortex flowmeter 6 in accordance with the present invention, the vortex flowmeter 6 comprises a vortex shedder 7, an electronic device 8, a sensor 9 and a circular pipe 10.

The vortex shedder 7 is comprised of a flat plate 71 perpendicular to a bluff body 72, and the vortex shedder 7 has a T-shape cross-section.

The electronic device 8 is fixed to the vortex shedder 7 and comprises an amplifier 8, a wave filter 82 and a signal processor 83; the amplifier 81 is electrically coupled to the sensor 9 for amplifying a signal outputted from the sensor 9; the wave filter 82 is electrically coupled to the amplifier 81 for filtering the unwanted noises of a signal outputted from the amplifier 81 and appropriately sampling an converted analog-to digital (A/D) sample frequency; the signal processor 83 is electrically coupled to the wave filter 82 and adopts a digital signal processor (DSP) architecture as its main hardware architecture, and the signal processor 83 comprises a wave filter unit 831 and a frequency calculating unit 832, and the wave filter unit 831 comprises a digital band-pass filter (DBPF) 8311 and an amplitude detector 8312; the digital band-pass filter 8311 receives a computation result of the amplitude detector 8312 to adjust its internal parameters and filter the noises of a signal transmitted from the wave filter 82; the frequency calculating unit 832 comprises a fast Fourier transformation (FFT) unit 8321 and an auto-correlation unit 8322; the fast Fourier transformation (FFT) unit 8321 is operated by a signal transmitted from the digital band-pass filter 8311; the auto-correlation unit 8322 is operated by a signal transmitted from the digital band-pass filter 8311 and a translation within a specific time. If the translation time is used as a variable, then related computation results in different translation time can be obtained. As correlation varies with translation time, the main frequency of the signal can be used for outputting the processed signal.

The sensor 9 is fixed to a flat plate 71 of the vortex shedder 7 and electrically coupled to the electronic device 8 for detecting the turbulence of pressure caused by the fluid during the vortex shedding process, and transmitting the signal to the amplifier 81 of the electronic device 8.

The circular pipe 10 has a penetrating hole 101 disposed at an appropriate position for fixing and limiting the vortex shedder 7, and the circular pipe 10 is connected to the pipeline having a fluid flow, such that the fluid passing through the circular pipe 10 produces shedding vortices by the vortex shedder 7, so as to constitute the vortex flowmeter 6.

The operation of the vortex flowmeter 6 in accordance with a preferred embodiment of the present invention is described as follows.

Figure 5:
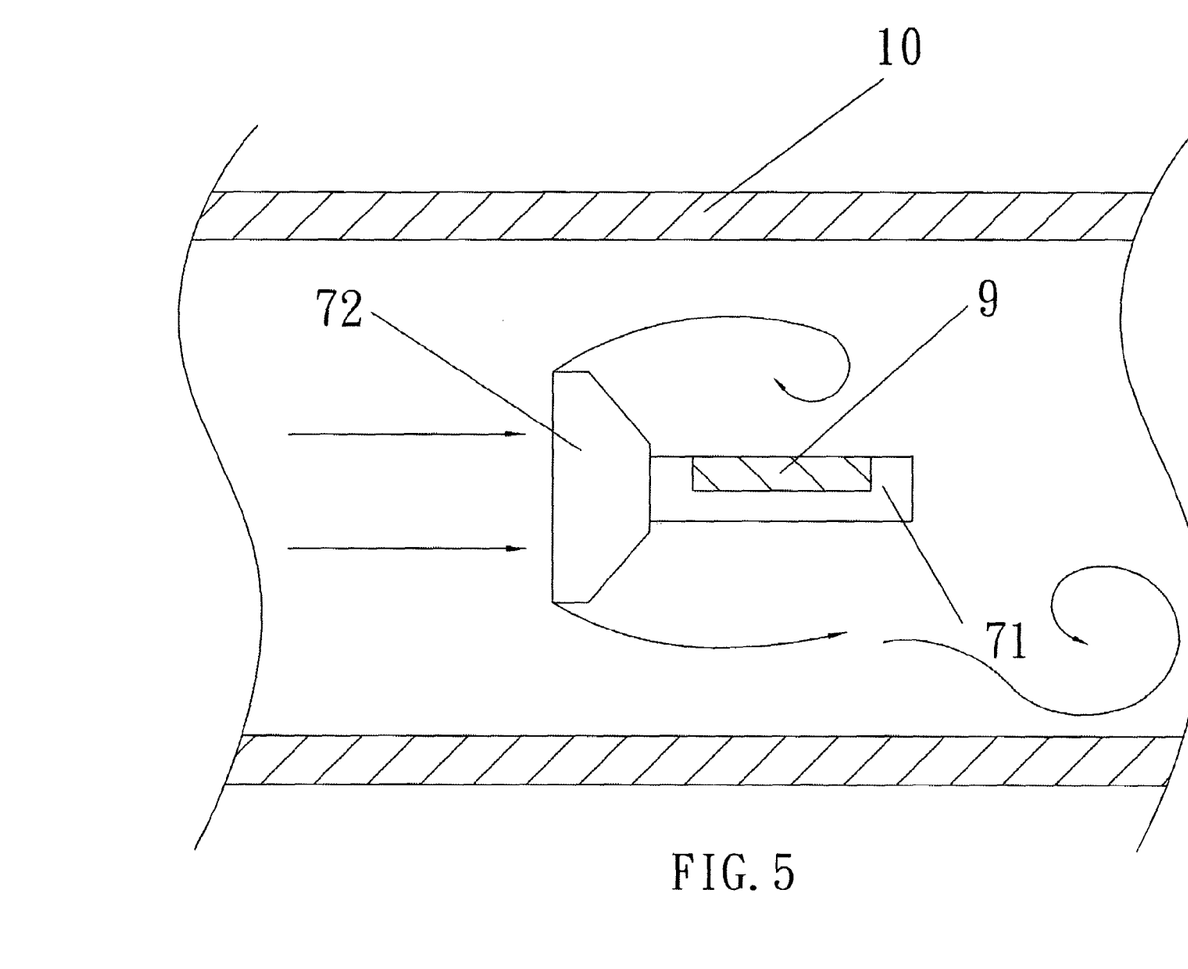
FIG. 5 is a schematic view of an application of a vortex flowmeter of the present invention.
Figure 6:
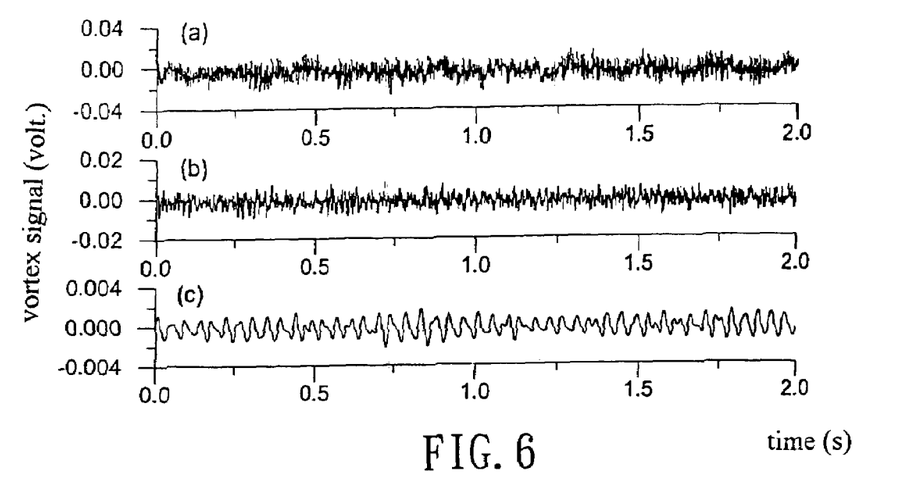
FIG. 6 is a schematic view of a vortex signal with a constant flow rate of the present invention.

Referring to FIG. 5 to a schematic view of using a vortex flowmeter 6 at the pipe 10, if the vortex flowmeter 6 is fixed to the circular pipe 10 and fluid flows through the circular pipe 10, the operation flow of a fluid vortex shedding process for the detection conducted by the vortex flowmeter 6 is described as follows:

Step 1: If a fluid flows in the pipe 10, the fluid will produce a vortex by the vortex shedder 7, and the sensor 9 will detect a pressure change of the fluid produced during the vortex shedding process, and the sensor 9 will output an original analog signal (as shown in FIG. 6a), and the original analog signal will be amplified by the amplifier 81 of the electronic device 8, and the amplified signal is filtered by the wave filter 82 (as shown in FIG. 6b), and the filtered signal is sampled by the analog-to-digital (A/D) sample frequency and the converted signal is transmitted to the signal processor 83.

Step 2: If the signal processor 83 receives a signal outputted from the wave filter 82, the amplitude of a signal transmitted from the wave filter 82 can be calculated by the amplitude detector 8312 of the signal processor 83, so as to estimate and obtain the main signal frequency.

Step 3: The amplitude detector 8312 transmits the estimated main signal frequency to the digital band-pass filter 8311, while adjusting the filter parameters of the digital band-pass filter 8311 by the main signal frequency, so as to filter the signals of the digital band-pass filter 8311 and remove unwanted noises (as shown in FIG. 6c).

Step 4: The signal processed by the digital band-pass filter 8311 is transmitted to a Schmitt trigger, and the signal in the form of a square wave is outputted to the outside, and serves as a control signal and a trigger signal for the automatic flow control, while outputting the signal processed by the digital band-pass filter 8311 to the frequency calculating unit 832. If the main frequency of the signal inputted from the frequency calculating unit 832 is smaller than 200 Hz, the auto-correlation unit 8322 will be used to obtain the actual fluid frequency. If the main frequency of the signal inputted from the frequency calculating unit 832 is greater than 200 Hz, then the fast Fourier transformation (FFT) unit 8321 will be used for obtaining the actual fluid frequency.

Step 5: If the signal processor 83 computes the frequency of shedding vortices, the result will be displayed on an external display device (such as LCD).

Figure 7:
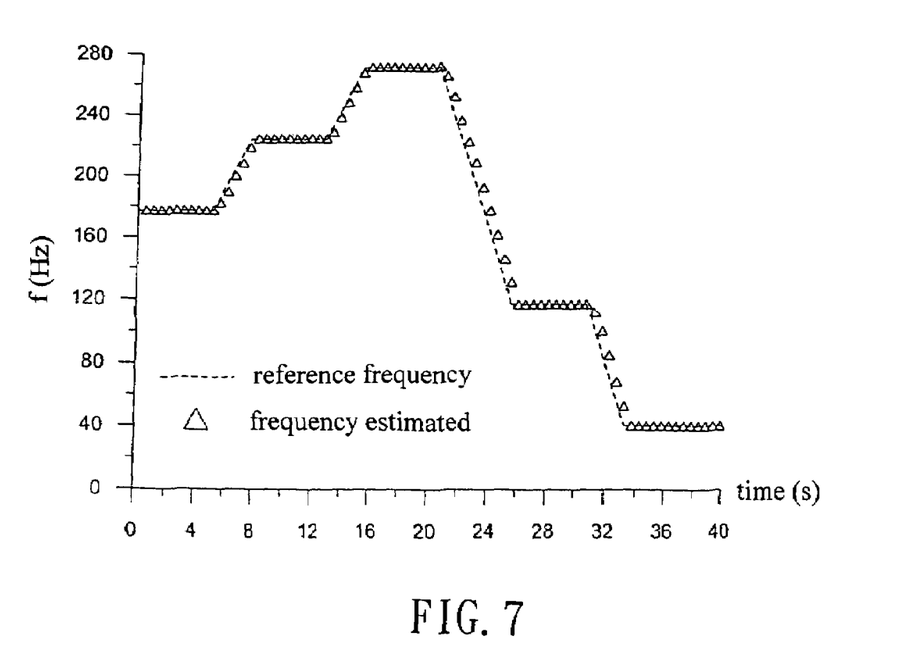
FIG. 7 is a comparison chart of a reference frequency and an actual output frequency of a vortex flowmeter of the present invention.

From the foregoing procedure, the vortex flowmeter 6 produces a pressure change of a fluid due to the vortex overflow of the fluid, and the sensor 9 of the vortex flowmeter 6 measures and outputs an original signal. After the vortex shedding signal having an original signal-noise ratio (SNR) of 1/12 is processed by the digital band-pass filter 8311 of the signal processor 83, the signal-noise ratio is increased to 2.4. As the flow rate of the fluid varies with time, the vortex flowmeter 6 still can track the main signal frequency as shown in FIG. 7, and the reference frequency in FIG. 7 stands for a signal frequency outputted from the amplitude detector 8312, and the actual output frequency stands for a signal frequency outputted from the signal processor 83.

Figure 8:
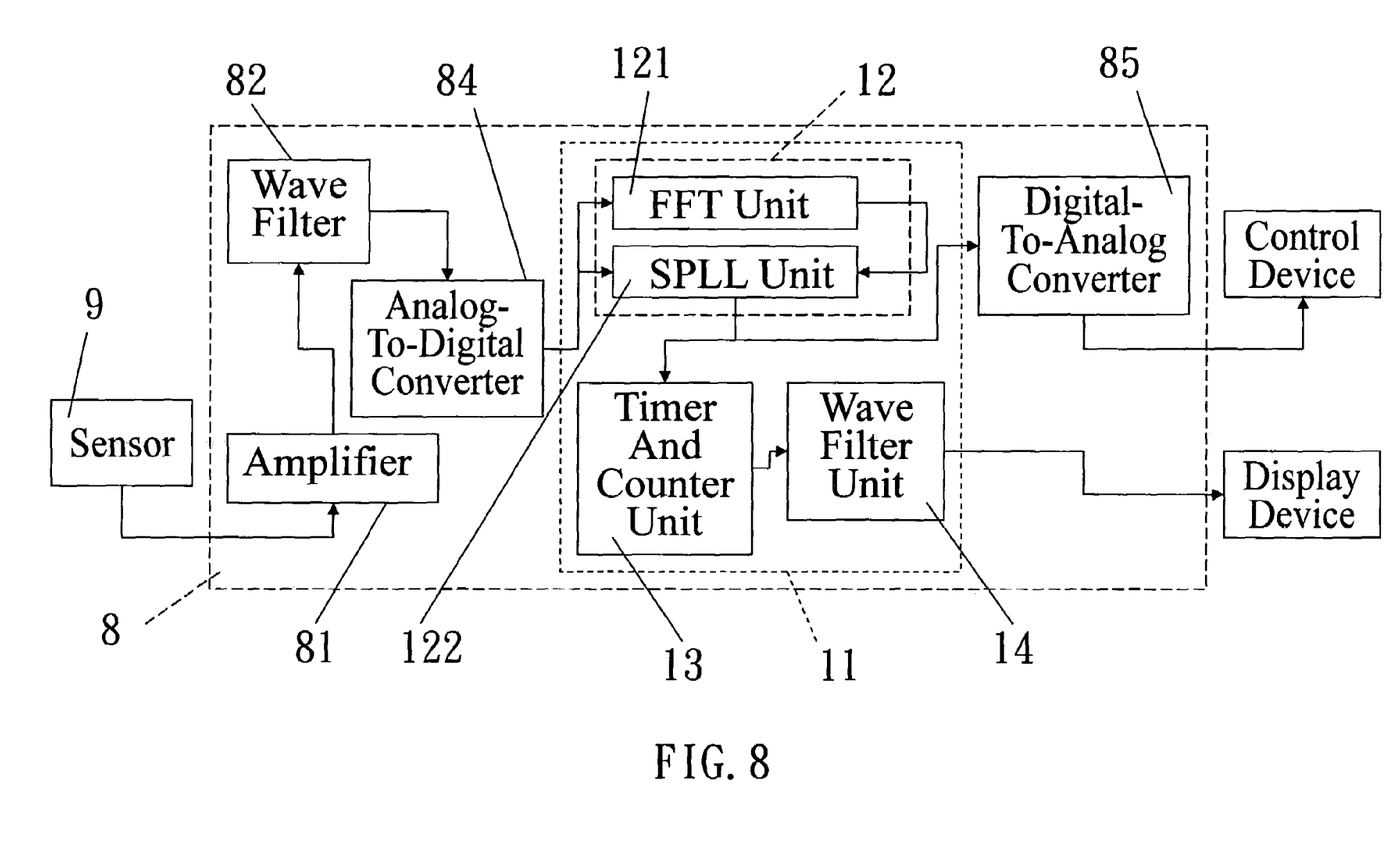
FIG. 8 is a block diagram of an overall structure of an electronic device and a sensor in accordance with another preferred embodiment of the present invention.

Referring to FIG. 8 for a block diagram of an overall structure of a vortex flowmeter 6 in accordance with another preferred embodiment of the present invention, the vortex flowmeter 6 comprises a vortex shedder 7, an electronic device 8, a sensor 9, and a circular pipe 10; and the major difference with the foregoing preferred embodiment resides on that the electronic device 8 comprises an amplifier 81, a wave filter 82, an analog-to-digital converter 84, a digital-to-analog converter 85 and a signal processor 11.

The analog-to-digital converter 84 is electrically coupled to the wave filter 82 and the signal processor 11, for converting an analog signal outputted from the wave filter 82 to a digital signal, and sending the digital signal to the signal processor 11.

The digital-to-analog converter 85 is electrically coupled to the signal processor 11 for converting a digital signal outputted from the signal processor 11 to an analog signal, and transmitting the analog signal to the outside.

The signal processor 11 uses a digital signal processor (DSP) architecture as its main hardware architecture, and the signal processor 11 comprises a frequency calculating unit 12, a timer and counter unit 12 and a wave filter unit 14, wherein the frequency calculating unit 12 comprises a fast Fourier transformation (FFT) unit 121 and a software phase locked loop (SPLL) unit 122; the fast Fourier transformation (FFT) unit 121 performs a spectral analysis for a digital signal outputted from the analog-to-digital converter 84. After the initial frequency is selected and an initial frequency is filtered, a main reference frequency is obtained, and the main reference frequency is outputted to the software phase locked loop (SPLL) unit 122; after the software phase locked loop (SPLL) unit 122 receives the main reference frequency outputted by the fast Fourier transformation (FFT) unit 121, the main reference frequency is used as a basis for adjusting the parameters. In other words, the software phase locked loop (SPLL) unit 122 uses the main reference frequency to adjust the center frequency of a digital voltage control oscillator and the amplification ratio of the phase comparator and the digital voltage control oscillator, and compare and track an original signal inputted from the sensor 9, such that if the signal inputted by the software phase locked loop (SPLL) unit 122 has noises, the main reference frequency will track the main signal frequency and output a signal with the same frequency or phase of a digital square wave (in a binary form of 0 an 1) to the digital-to-analog converter 85 and timer and counter unit 13.

After the timer and counter unit 13 receives the digital square wave outputted from the software phase locked loop (SPLL) unit 122, the timer and counter unit 13 counts the number of pulses in a predetermined unit time to obtain the main signal frequency and output the signal frequency to the wave filter unit 14. After the wave filter unit 14 receives a signal outputted from the timer and counter unit 13, the signal is filtered and sent to an external display device.

The operation of a vortex flowmeter 6 in accordance with another preferred embodiment of the present invention is described as follows:

Step 1: If a fluid flows in the pipe 10, the fluid will produce a vortex by the vortex shedder 7, and the sensor 9 will detect a pressure change of the fluid during the vortex shedding process, and the sensor 9 will output an original analog signal, and the original analog signal will be amplified by the amplifier 81 of the electronic device 8, and the amplified signal is filtered by the wave filter 82, and the filtered signal is sampled by the analog-to-digital (A/D) sample frequency and finally the processed signal is transmitted to the signal processor 11.

Step 2: If the signal processor 11 receives a signal transmitted from the wave filter 82 and inputs the signal to the fast Fourier transformation (FFT) unit 121 and software phase locked loop (SPLL) unit 122, the fast Fourier transformation (FFT) unit 121 will process the received signal and obtain and filter a spectrograph of the signal, and further obtain an initial reference frequency. After the initial reference frequency and the main reference frequency are filtered by the fast Fourier transformation (FFT) unit 121, the fast Fourier transformation (FFT) unit 121 transmits the main reference frequency to the software phase locked loop (SPLL) unit 122 as a reference frequency of the software phase locked loop (SPLL) unit 122. After the software phase locked loop (SPLL) unit 122 receives a signal transmitted from the wave filter 82 and compares and tracks the main reference frequency transmitted from the fast Fourier transformation (FFT) unit 121, the software phase locked loop (SPLL) unit 122 outputs a digital square wave (in a binary form of 0 and 1) having the same frequency or phase of the main signal, such that the user of the vortex flowmeter 6 can use the digital square wave inputted to an external control device as a control signal and a trigger signal for automatic flow control.

Step 3: When the software phase locked loop (SPLL) unit 122 outputs the digital square wave, the square wave is inputted to the timer and counter unit 13 to count the number of pulses in a predetermined time and obtain the main signal frequency, while the timer and counter unit 13 is outputting the main signal to the wave filter unit 14.

Step 4: When the wave filter unit 14 receives a signal outputted from the timer and counter unit 13, the signal is filtered and sent to an external display device (such as LCD) for displaying the result.

Figure 9:
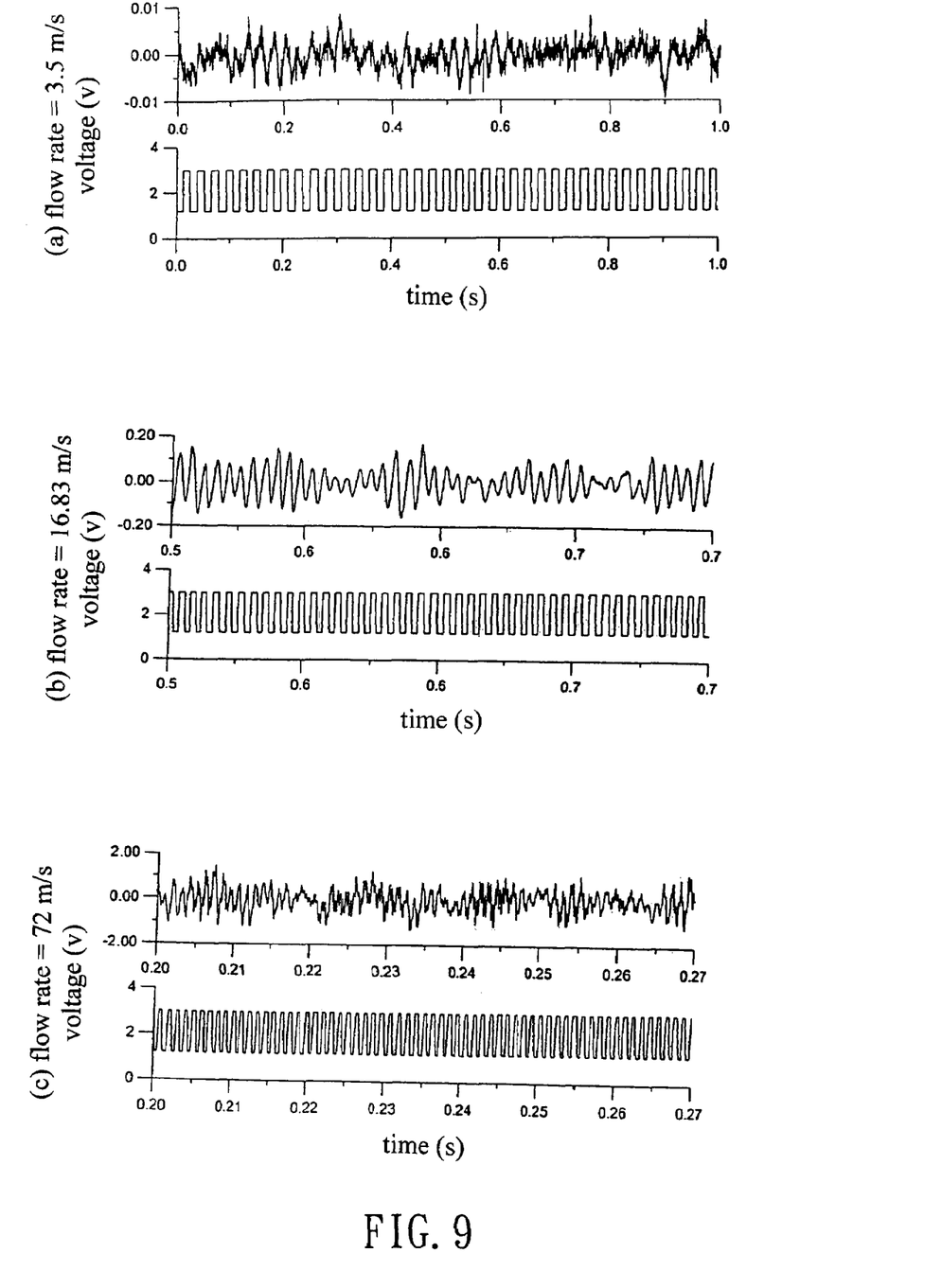
FIG. 9 is a schematic view of vortex signals with different flow rates of the present invention.

To achieve the effect of fixing the signal processor 11 to the vortex flowmeter 6, the internal diameter of the circular pipe 10 of the vortex flowmeter 6 is designed to be 50 mm. For tests taken at minimum tested flow rates of 3.5 m/s (or volume flow rate of 24.89 $m^3$/hr) and 16.8 m/s (or volume flow rate of 118.8 $m^3$/hr), and maximum tested flow rate of 72 m/s (or volume flow rate of 509.4 $m^3$/hr), an original signal outputted from the sensor 9 is compared with a square wave signal outputted from the software phase locked loop (SPLL) unit 122 (as shown in FIG. 9). Although each original signal contains irregular turbulence components (particularly significant for minimum and maximum tested flow rates), yet the signal processor 11 can track the main signal frequency in three flow rates, and outputs a square wave signal having the same frequency or phase of the original signal.

In summation of the description above, the intelligent signal processor of the vortex flowmeter in accordance with the present invention has the following advantages:

1. Traditionally, the timing of the first peak is generally used as a basis for calculating the frequency, but the signal processor of the vortex flowmeter of the invention uses an auto-correlation unit to operate with a fast Fourier transformation (FFT) unit to count the number of peaks in time-lag correlation coefficient values as a basis for calculating the frequency. Such calculation method can reduce the error of calculating the frequency.

2. The signal processor of the vortex flowmeter of the invention uses an auto-correlation unit to operate with a fast Fourier transformation (FFT) unit to reduce the error caused by the frequency and resolution during the calculation process. If the vortex shedding frequency is smaller than 200 Hz, the auto-correlation unit will be used for obtaining the vortex shedding frequency. If the vortex shedding frequency is greater than 200 Hz, the fast Fourier transformation (FFT) unit will be used for obtaining the vortex shedding frequency. In this method, the error of the vortex shedding frequency obtained at middle and high flow rates of the fluid is 0.3% only. For low flow rates and a signal-noise ratio of $1/12$, the error of the vortex shedding frequency is 1.1%.

3. The signal processor of the vortex flowmeter uses an auto-correlation unit to operate with a fast Fourier transformation (FFT) unit, such that if the flow rate of a fluid varies with time, the signal processor has the capability of tracking the vortex shedding frequency, and the tracking capability has a delay time of 0.512 second only.

4. In general, the software phase locked loop (SPLL) unit is comprised of an analog circuit, and capable of locking an inputted signal within a set frequency range. If an inputted signal does not fall within a set frequency range, then the software phase locked loop (SPLL) unit will be unable to track the inputted signal. The signal processor of the vortex flowmeter uses a software phase locked loop (SPLL) unit to operate a fast Fourier transformation (FFT) unit. The signal frequency obtained by the fast Fourier transformation (FFT) unit is used as a reference frequency of the software phase locked loop (SPLL) unit, and the reference frequency is used for adjusting the parameters of the phase locked loop such as the center frequency and the amplification ratio of the phase comparator and the voltage control oscillator, such that the software phase locked loop (SPLL) unit still can operate normally if the inputted frequency and amplitude have bigger changes.

5. The signal processor of the vortex flowmeter of the invention uses a software phase locked loop (SPLL) unit to operate with a fast Fourier transformation (FFT) unit to keep the signal processor to operate normally if the inputted frequency and amplitude of a signal have bigger changes. If the flow range ranges from 50 to 509 m³/hr, the precision falls between 0.59%~0.35%, which has improved about 2~3 times over the traditional processing method.

In summation of the description above, the present invention enhances the prior art and also complies with the patent application requirements. The description and its accompanied drawings are used for describing preferred embodiments of the present invention, and it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. An intelligent signal processor of a vortex flowmeter, and the vortex flowmeter comprising a vortex shedder, an electronic device, a sensor and a circular pipe, and the vortex shedder being comprised of a flat plate perpendicular to a bluff body, and the vortex shedder having a T-shape cross section; and the electronic device being fixed to the vortex shedder, and comprising an amplifier, a wave filter and a signal processor; the sensor being installed on the flat plate of the vortex shedder and electrically coupled to the electronic device; the circular pipe being provided for fixing and limiting the vortex shedder, and the circular pipe being connected to a pipeline having a fluid flow for forming a shedding vortex for a fluid passing through the circular pipe by the vortex shedder, characterized in that:

the signal processor is electrically coupled to the wave filter, and the signal processor comprises a wave filter unit and a frequency calculating unit, and the wave filter unit comprises a digital band-pass filter and an amplitude detector; the digital band-pass filter is provided for receiving a computation result from the amplitude detector to adjust its internal parameters, and filter noises of a signal transmitted from the wave filter;

the frequency calculating unit comprises a fast Fourier transformation (FFT) unit and an auto-correlation unit; the fast Fourier transformation (FFT) unit computes a signal output from the wave filter unit, and the auto-correlation unit computes the signal output from the wave filter unit;

wherein the vortex flowmeter produces a vortex in the fluid when measuring a fluid flow, and uses the measured vortex shedding frequency to compute the flow of the fluid.

2. The intelligent signal processor of a vortex flowmeter as claimed in claim 1, wherein the amplitude detector estimates and obtains the frequency of a signal transmitted from the wave filter of the electronic device, and outputs the frequency of the signal to the digital band-pass filter as a reference frequency of the digital band-pass filter, while using the frequency of the signal to adjust a filter parameter of the digital band-pass filter, for filtering the signal of the digital band-pass filter.

3. The intelligent signal processor of a vortex flowmeter as claimed in claim 1, wherein the frequency calculating unit computes a frequency by using a signal output from the digital band-pass filter, such that if the frequency of the signal is smaller than 200 Hz, then the auto-correlation unit will compute an actual vortex shedding frequency, and if the frequency of the signal is larger than 200 Hz, then the fast Fourier transformation (FFT) unit will compute an actual vortex shedding frequency.

4. An intelligent signal processor of a vortex flowmeter, and the vortex flowmeter comprising a vortex shedder, an electronic device, a sensor and a circular pipe, and the vortex shedder being comprised of a flat plate perpendicular to a bluff body, and the vortex shedder having a T-shape cross-section; the electronic device is fixed to the vortex shedder and comprises an amplifier, a wave filter, an analog-to-digital converter, a digital-to-analog converter and a signal processor; the sensor is fixed to a flat plate of the vortex shedder, and the circular pipe is provided for fixing the vortex shedder, and the circular pipe is connected to a pipeline having a fluid flow, such that the fluid passing through the circular pipe can be overflowed or discharged by the vortex shedder, characterized in that:

the signal processor is electrically coupled to the analog-to-digital converter and the digital-to-analog converter, and the signal processor mainly uses the architecture of the digital signal processor as a hardware architecture and comprises a frequency calculating unit, a timer and counter unit and a wave filter unit, wherein the frequency calculating unit comprises a fast Fourier transformation (FFT) unit and a software phase locked loop (SPLL) unit; the fast Fourier transformation (FFT) unit processes a digital signal output from the analog-to-digital converter, and outputs the processed digital signal to the software phase locked loop (SPLL) unit; the software phase locked loop (SPLL) unit processes a signal output from the fast Fourier transformation (FFT) unit and outputs a digital square wave to the digital-to-analog converter and the timer and counter unit;

the timer and counter unit receives and processes the square wave of the signal output from the frequency calculating unit, and outputs the processed digital square wave to the wave filter unit; and the wave filter unit filters the square wave of the signal output from the timer and counter unit;

wherein the vortex flowmeter produces a vortex when measuring a fluid flow, and computes the fluid flow by a vortex shedding frequency.

5. The intelligent signal processor of a vortex flowmeter as claimed in claim 4, wherein the fast Fourier transformation (FFT) unit receives a signal transmitted from the wave filter, computed by the fast Fourier transformation (FFT) unit and output to the software phase locked loop (SPLL) unit, and uses the frequency of the signal as a reference frequency of the software phase locked loop (SPLL) unit.

6. The intelligent signal processor of a vortex flowmeter as claimed in claim 4, wherein the software phase locked loop (SPLL) unit simultaneously receives signals inputted by the sensor and the fast Fourier transformation (FFT) unit, and uses the frequency of signals inputted from the fast Fourier transformation (FFT) unit as a reference frequency, while using the reference frequency to adjust a parameter of the software phase locked loop (SPLL) unit, and comparing and tracking an original signal inputted from the sensor, such that the software phase locked loop (SPLL) unit can output a square wave having the same frequency or phase of the original signal.

7. The intelligent signal processor of a vortex flowmeter as claimed in claim 4, wherein the timer and counter unit counts the number of pulses to calculate a main signal frequency within a predetermined unit time of the timer and counter unit by the square wave output from the software phase locked loop (SPLL) unit.

* * * * *